United States Patent
Hohn et al.

[11] Patent Number: 5,818,635
[45] Date of Patent: Oct. 6, 1998

[54] COMPUTER MONITOR VISOR

[76] Inventors: Jerome T. Hohn, 2614 N. Franki St., Orange, Calif. 92865; Vincent Figueroa, 4629 Trujillo Dr., Covina, Calif. 91722

[21] Appl. No.: 853,368

[22] Filed: May 8, 1997

[51] Int. Cl.[6] .............................. G02B 23/16; H04N 5/17
[52] U.S. Cl. .......................... 359/612; 359/609; 359/611; 348/842
[58] Field of Search .................................. 359/601–614, 359/803, 808, 811, 813, 819; 348/818, 832–843; 248/442.2, 918

[56] References Cited

U.S. PATENT DOCUMENTS

| | | | |
|---|---|---|---|
| 3,564,138 | 2/1971 | Harrold | 348/842 |
| 4,865,420 | 9/1989 | Schmidt | 348/834 |
| 5,069,529 | 12/1991 | Takahashi | 359/601 |
| 5,121,253 | 6/1992 | Waintroob | 359/601 |
| 5,528,424 | 6/1996 | Lentz et al. | 359/612 |

*Primary Examiner*—Thong Nguyen

[57] ABSTRACT

A new computer monitor visor for reducing glare from a monitor's video display screen. The inventive device includes a top panel with a side panel hanging downwards from each of the top panel's lateral edges. The side panels are attached to the top panel by a plurality of removable side attachment straps. The rear portion of the top panel rests on the top wall of a computer monitor over the video display screen. The computer monitor visor is held in position on the computer monitor by a pair of computer attachment straps attached to the back wall of the computer monitor and the upper surface of the top panel. A support brace is attached to each side panel bottom edge and extends downwards for resting on a surface to provide additional support to the side panels.

14 Claims, 3 Drawing Sheets

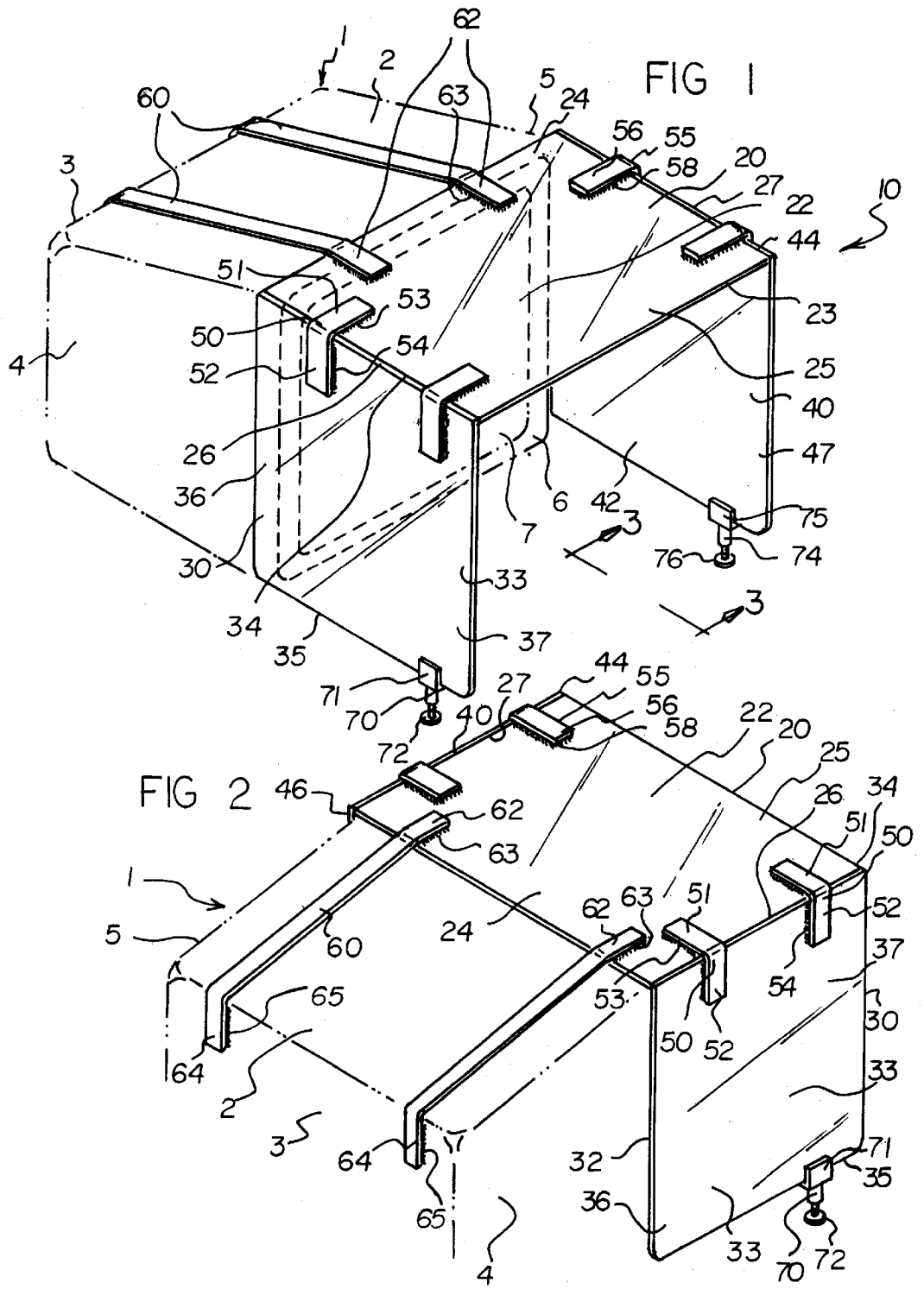

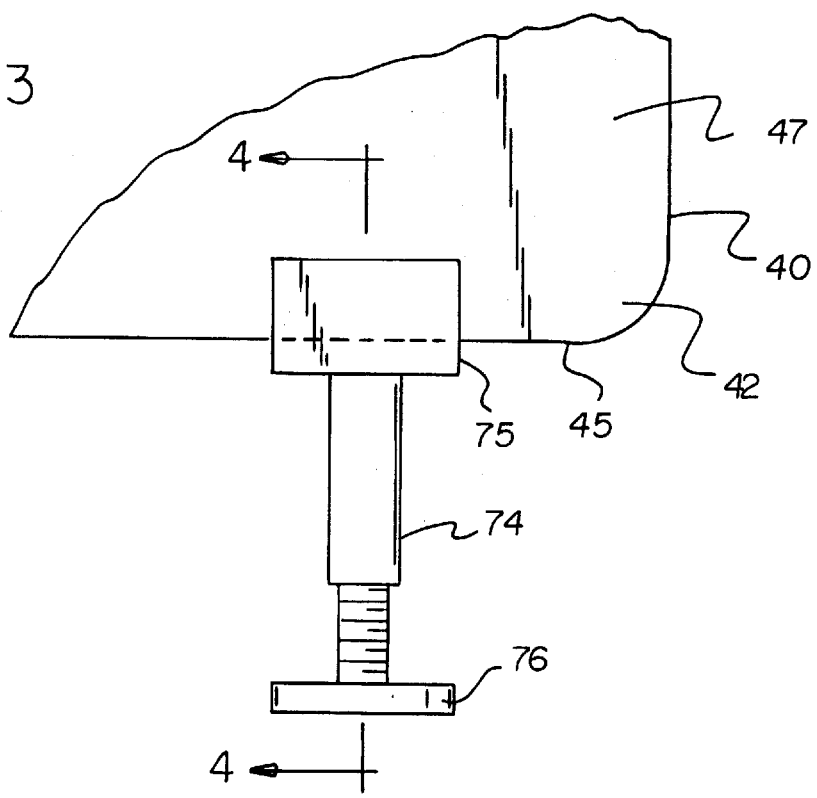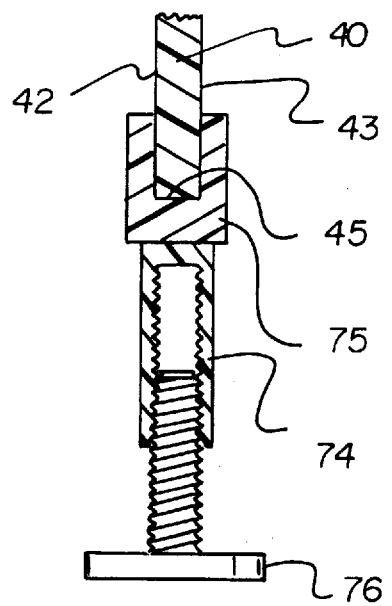

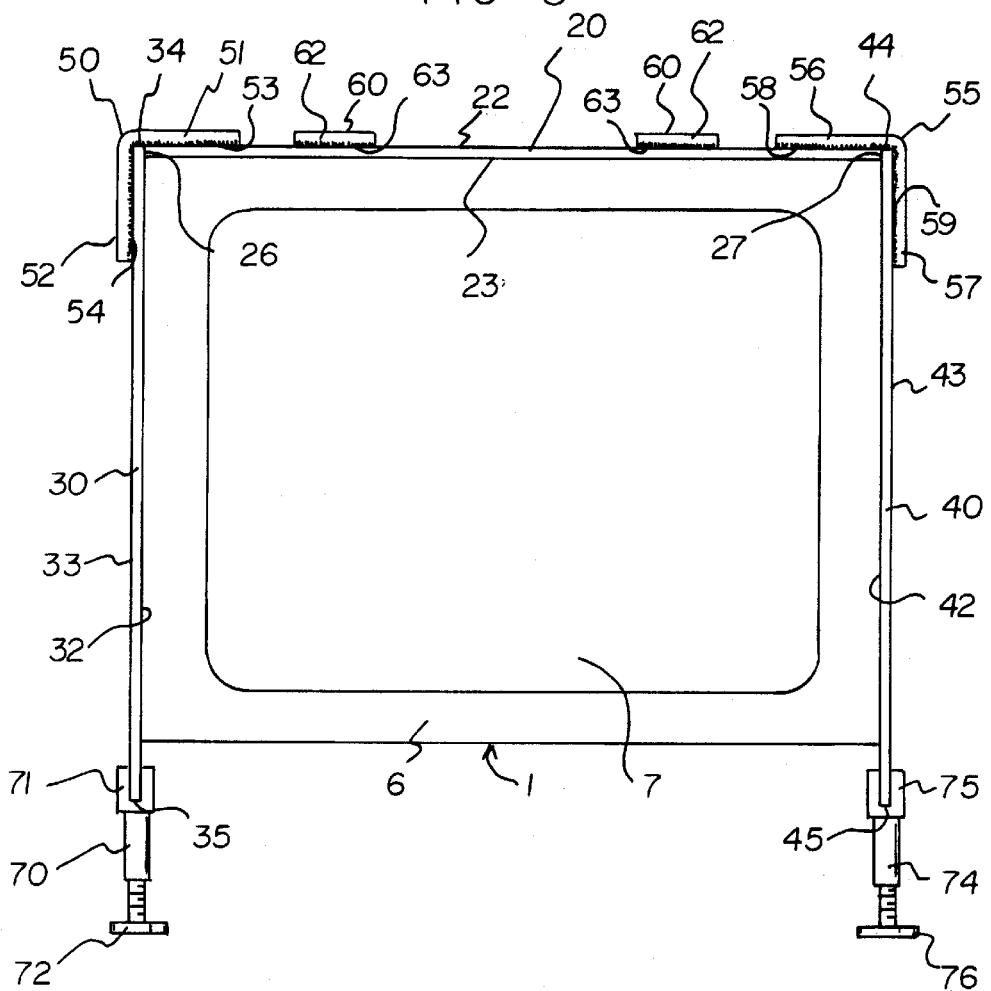

COMPUTER MONITOR VISOR

BACKGROUND OF THE INVENTION

1. Field of the Invention

The present invention relates to video display visors and more particularly pertains to a new computer monitor visor for reducing glare from a monitor's video display screen.

2. Description of the Prior Art

The use of video display visors is known in the prior art. More specifically, video display visors heretofore devised and utilized are known to consist basically of familiar, expected and obvious structural configurations, notwithstanding the myriad of designs encompassed by the crowded prior art which have been developed for the fulfillment of countless objectives and requirements.

Known prior art video display visors include U.S. Pat. No. 5,233,468; U.S. Pat. No. 5,115,345; U.S. Pat. No. Des. 323,322; U.S. Pat. No. 5,101,298; and U.S. Pat. No. 5,121,253.

While these devices fulfill their respective, particular objectives and requirements, the aforementioned patents do not disclose a new computer monitor visor. The inventive device includes a top panel with a side panel hanging downwards from each of the top panel's lateral edges. The side panels are attached to the top panel by a plurality of removable side attachment straps. The rear portion of the top panel rests on the top wall of a computer monitor over the video display screen. The computer monitor visor is held in position on the computer monitor by a pair of computer attachment straps attached to the back wall of the computer monitor and the upper surface of the top panel. A support brace is attached to each side panel bottom edge and extends downwards for resting on a surface to provide additional support to the side panels.

In these respects, the computer monitor visor according to the present invention substantially departs from the conventional concepts and designs of the prior art, and in so doing provides an apparatus primarily developed for the purpose of reducing glare from a monitor's video display screen.

SUMMARY OF THE INVENTION

In view of the foregoing disadvantages inherent in the known types of video display visors now present in the prior art, the present invention provides a new computer monitor visor construction wherein the same can be utilized for reducing glare from a monitor's video display screen.

The general purpose of the present invention, which will be described subsequently in greater detail, is to provide a new computer monitor visor apparatus and method which has many of the advantages of the video display visors mentioned heretofore and many novel features that result in a new computer monitor visor which is not anticipated, rendered obvious, suggested, or even implied by any of the prior art video display visors, either alone or in any combination thereof.

To attain this, the present invention generally comprises a top panel with a side panel hanging downwards from each of the top panel's lateral edges. The side panels are attached to the top panel by a plurality of removable side attachment straps. The rear portion of the top panel rests on the top wall of a computer monitor over the video display screen. The computer monitor visor is held in position on the computer monitor by a pair of computer attachment straps attached to the back wall of the computer monitor and the upper surface of the top panel. A support brace is attached to each side panel bottom edge and extends downwards for resting on a surface to provide additional support to the side panels.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new computer monitor visor apparatus and method which has many of the advantages of the video display visors mentioned heretofore and many novel features that result in a new computer monitor visor which is not anticipated, rendered obvious, suggested, or even implied by any of the prior art video display visors, either alone or in any combination thereof.

It is another object of the present invention to provide a new computer monitor visor which may be easily and efficiently manufactured and marketed.

It is a further object of the present invention to provide a new computer monitor visor which is of a durable and reliable construction.

An even further object of the present invention is to provide a new computer monitor visor which is susceptible of a low cost of manufacture with regard to both materials and labor, and which accordingly is then susceptible of low prices of sale to the consuming public, thereby making such computer monitor visor economically available to the buying public.

Still yet another object of the present invention is to provide a new computer monitor visor which provides in the apparatuses and methods of the prior art some of the advantages thereof, while simultaneously overcoming some of the disadvantages normally associated therewith.

Still another object of the present invention is to provide a new computer monitor visor for reducing glare from a monitor's video display screen.

Yet another object of the present invention is to provide a new computer monitor visor which includes a top panel with a side panel hanging downwards from each of the top panel's lateral edges. The side panels are attached to the top panel by a plurality of removable side attachment straps. The rear portion of the top panel rests on the top wall of a computer monitor over the video display screen. The computer monitor visor is held in position on the computer monitor by a pair of computer attachment straps attached to the back wall of the computer monitor and the upper surface of the top panel. A support brace is attached to each side panel bottom edge and extends downwards for resting on a surface to provide additional support to the side panels.

Still yet another object of the present invention is to provide a new computer monitor visor that is easy to assemble and install on a computer monitor.

Even still another object of the present invention is to provide a new computer monitor visor that enhances the privacy of the video display screen by providing a visual barrier to third parties.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective side view of a new computer monitor visor according to the present invention;

FIG. 2 is a schematic perspective rear view showing the computer attachment straps attached to the back wall of the computer monitor;

FIG. 3 is a schematic broken away side view of the support brace as seen from line 3—3 on FIG. 1;

FIG. 4 is a schematic cross sectional side view taken from line 4—4 of FIG. 3; and FIG. 5 is a schematic front side view of the present invention.

DESCRIPTION OF THE PREFERRED EMBODIMENT

In With reference now to the drawings, and in particular to FIGS. 1 through 5 thereof, a new computer monitor visor embodying the principles and concepts of the present invention and generally designated by the reference numeral 10 will be described.

The computer monitor visor 10 is designed for use with a computer monitor 1 having a top wall 2, a back wall 3, a first side wall 4, a second side wall 5, and a forward surface 6 having a video display screen 7.

As best illustrated in FIGS. 1 through 5, the computer monitor visor 10 comprises a top panel 20 having an upper surface 22, a lower surface 23, a rear portion 24, a front portion 25, a first edge 26 and a second edge 27. The top panel edges 26,27 are laterally extended towards their respective computer monitor side wall 4,5. The rear portion 24 rests on the computer monitor top wall 2 while the front portion 25 extends forwards from the computer monitor video display screen 7.

The computer monitor visor 10 also includes a side panel 30,40 hanging downwards from either edge 26,27 of the top panel 20. Each side panel 30 40 has an inner surface 32,42, an outer surface 33,43, a top edge 34,44, a bottom edge 35,45, a rear portion 36,46, and a front portion 37,47. The side panels 30,40 are orientated so that their interior surfaces 32,42 face each other. Preferably each side panel rear portion 36,46 is positioned adjacent their respective computer monitor side wall 4,5 so that their forward portions 37,47 extend forwards from the computer monitor forward surface video display screen 7. Also preferably, the side panel top edges 34,44 are positioned adjacent their respective top panel edge 26,27.

Optionally, a black colored coating may be applied to the top panel lower surface 23 and the interior surfaces 32,42 of the side panels 30,40 to further reduce glare on the video display screen 7.

Preferably, the side panels 30,40 are attached to the top panel 20 by a plurality of side attachment strips 50,55 on each side. The top panel end 51,56 of each side attachment strip 50,55 is attached to the top panel upper surface 22. Similarly, the side attachment strap side panel ends 52,57 are attached the outer surface 33,43 of their respective side panel 30,40. Preferably, the side attachment strips 50,55 are detachably attached to the top panel 20 and side panels 30,40 by hook and loop fasteners 53,54,58,59.

The computer monitor visor 10 is attached to a computer monitor 1 by a plurality of spaced apart and elongate computer attachment straps 60. Each computer attachment strap 60 has a top panel attachment end 62 and a monitor attachment end 64. The top panel attachment ends 62 of the computer attachment straps 60 are coupled to the top panel upper surface 22. The computer attachment straps extend from the top panel rear portion 24 over the computer monitor top wall 2 so that their monitor attachment ends 64 are attached to the back wall 3 of the computer monitor 1. Preferably, the computer attachment straps are detachably attached to the top panel upper surface 22 and the computer monitor back wall 3 by hook and loop fasteners 63,65 at their top panel attachment ends 62 and their monitor attachment ends 64.

The invention further includes an elongate support brace 70,74 for each side panel 30,40. Each support brace 70,74 has a clip end 71,75 and a base end 72,76. The clip ends 71,75 are coupled to their respective side panel 30,40 so that the bottom edge 35,45 of the side panels 30,40 rests on the clip end 71,75. Preferably, the support brace base ends 72,76 are adjustably extendible from the clip ends 71,75 so that the base ends 72,76 may be extended to rest on surfaces that are varying distances below the computer monitor visor 10.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A computer monitor visor for mounting on a computer monitor having a top wall, a back wall, a first side wall, a second side wall and a forward surface having a video display screen, said computer monitor visor comprising:

a top panel having an upper surface, a rear portion, a first edge and a second edge, said rear portion being for resting on a computer monitor top wall, said first edge being for lateral extension towards a computer monitor first side wall, said second edge being for lateral extension towards a computer monitor second side wall;

an elongate computer attachment strap having a top panel attachment end and a monitor attachment end, said top panel attachment ends being coupled to said top panel upper surface, said monitor attachment ends being for attachment to a computer monitor back wall;

a first side panel having an inner surface, an outer surface, said first side panel being downwardly depended from said top panel first edge;

an elongate first support brace having a clip end and a base end, said first support brace clip end being coupled to said first side panel, said first support brace base end being for resting on a surface;

a first side attachment strap having a top panel end and a first side panel end, said first side attachment strap top panel end being coupled to said top panel upper surface, said first side attachment strap first side panel end being coupled to said first side panel outer surface;

a second side panel having an inner surface, an outer surface, said second side panel being downwardly depended from said top panel second edge, said second side panel interior surface facing said first side panel interior surface;

an elongate second support brace having a clip end and a base end, said second support brace clip end being coupled to said second side panel, said second support brace base end being for resting on a surface; and a second side attachment strap having a top panel end and a second side panel end, said second side attachment strap top panel end being coupled to said top panel upper surface, said second side attachment strap second side panel end being coupled to said second side panel outer surface.

2. The computer monitor visor of claim 1, wherein there are a plurality of computer attachment straps.

3. The computer monitor visor of claim 1, wherein there are a plurality of first side attachment straps and a plurality of second side attachment straps.

4. The computer monitor visor of claim 1, wherein said first side attachment strap top panel end is detachably attached to said top panel upper surface and said first side attachment strap first side panel end is detachably attached to said first side panel outer surface, and wherein said second side attachment strap top panel end is detachably attached to said top panel upper surface and said second side attachment strap second side panel end is detachably attached to said second side panel outer surface.

5. The computer monitor visor of claim 1, wherein said computer attachment strap top panel attachment end is detachably attached to said top panel upper surface and said computer attachment strap monitor attachment end being for detachable attachment to a computer monitor back wall.

6. A computer monitor visor for mounting on a computer monitor having a top wall, a back wall, a first side wall, a second side wall and a forward surface having a video display screen, said computer monitor visor comprising:

a top panel having an upper surface, a lower surface, a rear portion, a front portion, a first edge and a second edge, said rear portion being for resting on a computer monitor top wall, said first edge being for lateral extension towards a computer monitor first side wall, said second edge being for lateral extension towards a computer monitor second side wall, said front portion being for forward extension from a computer monitor forward surface video display screen;

a plurality of spaced apart elongate computer attachment straps each having a top panel attachment end and a monitor attachment end, said top panel attachment ends being coupled to said top panel upper surface, said computer attachment straps being for extension from said top panel rear portion towards a computer monitor back wall, said monitor attachment ends being for attachment to a computer monitor back wall;

a first side panel having an inner surface, an outer surface, a top edge, a bottom edge, a rear portion and a front portion, said first side panel being downwardly depended from said top panel first edge;

an elongate first support brace having a clip end and a base end, said first support brace clip end being coupled to said first side panel, said first support brace base end being adjustably extendible from said first support brace clip end, said first support brace base end being for resting on a surface;

a plurality of first side attachment straps each having a top panel end and a first side panel end, each said first side attachment strap top panel ends being coupled to said top panel upper surface, each said first side attachment strap first side panel ends being coupled to said first side panel outer surface;

a second side panel having an inner surface, an outer surface, a top edge, a bottom edge, a rear portion, and a front portion, said second side panel being downwardly depended from said top panel second edge, said second side panel interior surface facing said first side panel interior surface;

an elongate second support brace having a clip end and a base end, said second support brace clip end being coupled to said second side panel, said second support brace base end being adjustably extendible from said second support brace clip end, said second support brace base end being for resting on a surface; and a plurality of second side attachment straps each having a top panel end and a second side panel end, each said second side attachment strap top panel ends being coupled to said top panel upper surface, each said second side attachment strap second side panel ends being coupled to said second side panel outer surface.

7. The computer monitor visor of claim 6, wherein said first side attachment strap top panel ends are detachably attached to said top panel upper surface and said first side attachment strap first side panel ends are detachably attached to said first side panel outer surface, and wherein said second side attachment strap top panel ends are detachably attached to said top panel upper surface and said second side attachment strap second side panel ends are detachably attached to said second side panel outer surface.

8. The computer monitor visor of claim 7, wherein said first side attachment strap top panel ends are attached to said top panel upper surface by means of a hook and loop fastener and said first side attachment strap first side panel ends are attached to said first side panel outer surface by means of a hook and loop fastener, and wherein said second side attachment strap top panel ends are attached to said top panel upper surface by means of a hook and loop fastener and said second side attachment strap second side panel ends are attached to said second side panel outer surface by means of a hook and loop fastener.

9. The computer monitor visor of claim 6, wherein said computer attachment strap top panel attachment ends are detachably attached to said top panel upper surface and said computer attachment strap monitor attachment ends being for detachable attachment to a computer monitor back wall.

10. The computer monitor visor of claim 9, wherein said computer attachment strap top panel attachment ends are detachably attached to said top panel upper surface by means of a hook and loop fastener and said computer attachment strap monitor attachment ends being for detachable attachment to a computer monitor back wall by means of a hook and loop fastener.

11. The computer monitor visor of claim 6, further including a black colored coating applied to said top panel lower surface, said first side panel interior surface, and said second side panel interior surface to further reduce glare on a computer monitor forward surface video display screen.

12. The computer monitor visor of claim 6, wherein said first side panel rear portion is for positioning adjacent a computer monitor first side wall and said first side panel forward portion being for forward extension from a computer monitor forward surface video display screen, and wherein said second side panel rear portion is for positioning adjacent a computer monitor second side wall and said second side panel forward portion being for substantially forward extension from a computer monitor forward surface video display screen.

13. The computer monitor visor of claim 6, wherein first side panel top edge is positioned adjacent said top panel first edge and wherein said second side panel top edge is positioned adjacent said top panel second edge.

14. The computer monitor visor of claim 6, wherein said first side panel bottom edge rests on said first support brace clip end and wherein said second side panel bottom edge rest on said second support brace clip end.

* * * * *